United States Patent [19]

Scott

[11] E Re. 30,256

[45] Reissued Apr. 8, 1980

[54] FRICTION ROCK STABILIZERS

[76] Inventor: James J. Scott, Lecoma Star Rte., Rolla, Mo.

[21] Appl. No.: 857,048

[22] Filed: Dec. 2, 1977

Related U.S. Patent Documents

Reissue of:

[64] Patent No.: 3,922,867
Issued: Dec. 2, 1975
Appl. No.: 520,310
Filed: Nov. 4, 1974

U.S. Applications:

[63] Continuation-in-part of Ser. No. 430,695, Jan. 4, 1974, abandoned, which is a continuation-in-part of Ser. No. 330,954, Feb. 9, 1973, abandoned.

[51] Int. Cl.[2] ..... E21D 21/00; E21D 20/00

[52] U.S. Cl. ..... 405/259; 85/8.3

[58] Field of Search ..... 61/45 B, 63, 53.68, 61/45 R; 85/8.3, 84, 80, 85, 32.1

[56] References Cited

U.S. PATENT DOCUMENTS

| | | | |
|---|---|---|---|
| 2,006,813 | 7/1935 | Norwood | 85/84 X |
| 2,240,425 | 4/1941 | Sternbergh | 85/84 X |
| 2,246,888 | 6/1941 | Messenger | 85/84 |
| 2,430,543 | 11/1947 | Tinnerman | 85/84 X |
| 2,448,351 | 8/1948 | Brush | 85/84 |
| 2,648,247 | 8/1953 | Schmuziger | 85/8.3 |
| 2,754,716 | 7/1956 | Bourns | 85/8.3 |
| 2,972,275 | 2/1961 | Baubles | 85/8.3 |
| 3,157,417 | 11/1964 | Ruskin | 85/84 |
| 3,187,620 | 6/1965 | Fischer | 85/84 X |
| 3,227,030 | 1/1966 | Preziosi et al. | 85/8.3 X |
| 3,349,567 | 10/1967 | Munn | 61/45 B |
| 3,354,791 | 11/1967 | Wahlmark | 85/8.3 X |
| 3,630,261 | 12/1971 | Gley | 85/8.3 X |

FOREIGN PATENT DOCUMENTS

| | | | |
|---|---|---|---|
| 1443392 | 5/1966 | France | 61/45 B |
| 825003 | 12/1959 | United Kingdom | 61/45 B |
| 1028664 | 5/1966 | United Kingdom | 85/84 |

*Primary Examiner*—Dennis L. Taylor
*Attorney, Agent, or Firm*—Bernard J. Murphy

[57] ABSTRACT

Friction rock stabilizers such as for example roof anchors, comprising a generally annular body which from end-to-end has a slot through its thickness and is circumferentially compressible for installation into a bore of diameter substantially smaller than the normal outer diameter of the body whereby, after such installation, the resilience of the body causes the body outer periphery to anchor by frictional engagement with the surrounding wall of the bore. Also, an anchoring method employing a stabilizer of this type.

15 Claims, 5 Drawing Figures

FRICTION ROCK STABILIZERS

Matter enclosed in heavy brackets [ ] appears in the original patent but forms no part of this reissue specification; matter printed in italics indicates the additions made by reissue.

This is a Continuation-in-Part of my U.S. Pat. Application Ser. No. 430,695 filed Jan. 4, 1974, *now abandoned* which is a Continuation-in-Part of my U.S. Pat. Application Ser. No. 330,954 filed Feb. 9, 1973, now abandoned.

The present invention relates to the anchoring of a structure such as a roof or side wall of a mine shaft or other underground opening, and more specifically to the provision of new and improved friction rock stabilizers and stabilizing methods particularly adapted for such anchoring.

An object of the present invention is to provide new and improved friction rock stabilizers which are highly efficient in operation while relatively simple and economical in construction.

*It is particularly yet another object of this invention to set forth a friction stabilizer for insertion in a bore in a structure such as a roof or side wall of a mine shaft or other underground opening for anchoring the structure, said stabilizer comprising a generally tubular body of substantially one cross-sectional configuration along substantially its full length, said body having a maximum transverse dimension predetermined to be larger than the maximum transverse dimension of the bore in which it is to be inserted, whereby insertion of said body in such bore causes circumferential compression and deformation of said body, the stabilizer being free of structure precluding such circumferential compression and deformation of said body, and said body being of material which, in response to a bore insertion of said stabilizer (a) permits both said circumferential compression of said body, and a transverse deformation thereof as well, in the event of a shift in a plane transverse to the length of said stabilizer, of a section or sections of any such bored structure in which said stabilizer shall have been inserted; (b) causes said body to frictionally engage the wall of any such bore, thereby to anchor the bored structure, substantially fully along a continuous and substantially full length of said body, with a given, substantially uniformly distributed, anchoring force; and which also (c) maintains not less than substantially all said given anchoring force, even in the event of partial or full collapse of said body at some location therealong, in that portions of said body, defined by or subsisting opposite any such collapse, apply same proportionate anchoring forces to corresponding portions of such bore wall thereabout, whether such portions of said body are coaxially or linearly aligned with each other, or displaced or shifted therebetween by any such collapse.*

Another object of the invention is to provide new and improved stabilizing methods particularly adapted to provide highly efficient anchoring through the employment of a stabilizer which is relatively simple and economical in construction.

Other objects and advantages of the invention will be apparent from the following description taken in connection with the accompanying drawings wherein, as will be understood, the preferred forms of the invention have been given by way of illustration only.

In accordance with the invention, a friction rock stabilizer may comprise a generally annular body from end-to-end having a slot through its thickness, the body including edge portions extending along opposite sides of such a slot and the width of the slot being sufficiently great to space apart such edge portions a distance permitting substantial circumferential compression of the body for insertion thereof in a bore of diameter smaller than the outer diameter of the body in uncompressed condition, the anchor being free of structure precluding such substantial circumferential compression of the body, and the body being of material permitting its said substantial circumferential compression for insertion in such a bore and, after such insertion, causing the body outer periphery to frictionally engage the surrounding wall of the bore for anchoring a roof.

Also, in accordance with the invention, a structure such as a roof or side wall of a mine shaft or other underground tunnel may be anchored by a method which may comprise the steps of forming a bore in the structure to be anchored, providing a circumferentially compressible stabilizer having an outer periphery of a diameter larger than that of the formed bore, and inserting the stabilizer into the bore whereby the stabilizer is circumferentially compressed and the outer periphery of the circumferentially compressed stabilizer frictionally engages the wall of the bore.

Referring to the drawings.

Figure 2:
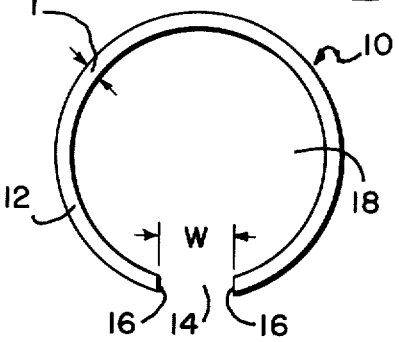
FIG. 2 is a top or plan view of the stabilizer illustrated in FIG. 1.
Figure 1:
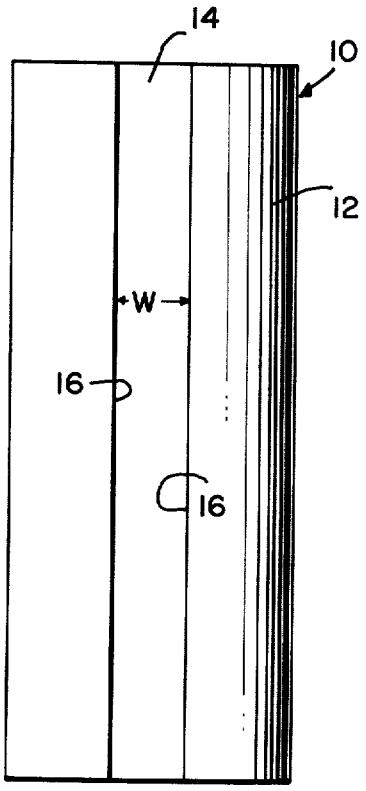
FIG. 1 is an elevational side view of one stabilizer constructed in accordance with the present invention.

Referring more particularly to the drawings wherein similar reference characters designate corresponding parts throughout the several views, FIGS. 1 and 2 illustrate a friction rock stabilizer, designated generally as 10, which, although relatively simple and economical in construction, is highly efficient in anchoring a structure such as a roof or side wall of a mine shaft or other undergound opening. As shown in such FIGS., the stabilizer 10 consists of an elongated, generally annular, open-ended body 12 having a single, longitudinally extending, straight-slot 14 formed through its radial thickness T from end-to-end, or throughout the length, of the body 12. The body 12 is imperforate, cylindrical and of constant outer diameter from end-to-end, the ratio of the length of the body 12 to the outer diameter thereof being at least a minimum of about 16 to 1 and preferably of about 32 to 1 or 48 to 1 although such longer stabilizers could be formed of interconnected sections each of 16 to 1 ratio or greater. The opposite longitudinal sides of the slot 14 are defined by opposed longitudinally extending edge portions 16 of the body 12; and the circumferential dimension or width W of the slot 14, with the body 12 in uncompressed condition, is sufficiently great to space apart the edge portions 16 a circumferential distance permitting substantial circumferential compression of the body 12 for insertion thereof in a bore of diameter substantially smaller than the outer diameter of the body 12. The outer circumferential dimension of the body 12, not including the width W of the slot 14, is greater than about two inches; and the width W of the slot 14 is no greater than a maximum of about twenty-five percent of the overall outer circumferential dimension of the stabilizer 10—that is, no greater than about twenty-five percent of the complete annulus formed by the body 12 and slot 14.

The body 12 is constructed of steel, thus permitting its substantial circumferential compression for insertion in such a substantially smaller diameter bore and, after such insertion, causing the body outer circumference to frictionally engage the surrounding wall of the bore for anchoring a structure such as the roof of a mine shaft. Also, as will be noted, the anchor 10 is entirely free of structure precluding such substantial circumferential compression of the body 12, the interior 18 of the body 12 being open or empty. The outer diameter of the body 12 of the stabilizer 10 for any given size bore is predetermined to be substantially larger than the diameter of the bore, but such that the edge portions 16 of the body 12 will be abutting, or spaced apart by only a relatively small gap, with the stabilizer 10 installed in the bore. The ratio of the radial thickness T of the body 12 to the body outer diameter is no greater than a maximum of about 1 to 5 and no less than a minimum of about 1 to 50, thereby permitting plastic deformation of the body 12 during its insertion in the bore; and, although the body 12 has been shown as being of constant outer diameter from end-to-end, the outer diameter of the body forward or leading end could be of lesser outer diameter than the remainder of the body 12 to facilitate said insertion.

Figure 4:
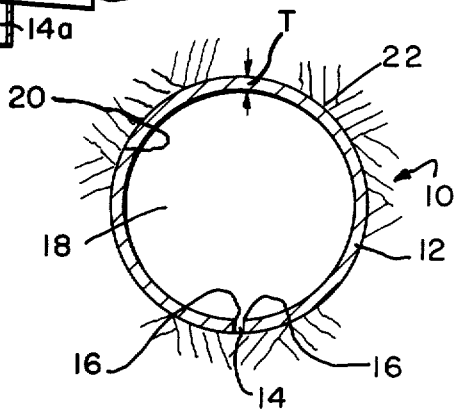
FIG. 4 is a sectional view of the stabilizer as shown in FIG. 3, taken on Line 4–4 of FIG. 3 looking in the direction of the arrows.
Figure 3:
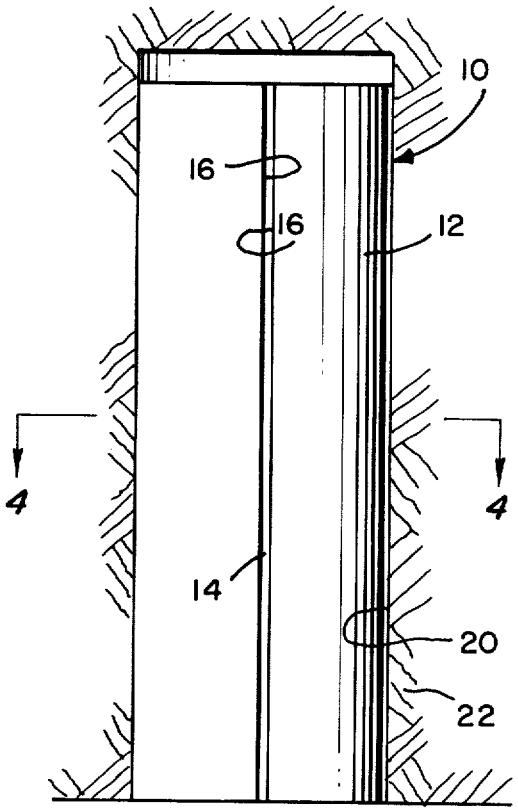
FIG. 3 is an elevational side view showing the stabilizer of FIG. 1 in operative position in a bore formed in the roof of a mine shaft or other underground opening.

FIGS. 3 and 4 illustrate the stabilizer 10 of FIGS. 1 and 2 in installed condition in a pre-drilled bore 20 in a roof 22 to be anchored thereby. During such insertion, the body 12 of the stabilizer 10 is deformed plastically (that is, deformed in the plastic range) to a condition whereby $$\Delta/D \times t/D > 0.84\Sigma y/E$$

Δ—being the difference between the outer diameter of the body 12 before insertion and the outer diameter of the body 12 after insertion, D—being the outer diameter of the body 12 before insertion, t—being the radial thickness of the body 12, E—being Young's Modulus, and Σy—being the yield stress of the material.

As shown, the outer circumference of the body 12 of the installed stabilizer 10 frictionally engages the surrounding wall of the bore 20 throughout the length of the body 12; and the stabilizer 10 anchors by this frictional engagement of the outer circumference of the body 12 with the wall of the bore 20. The body outer circumference may, of course, be epoxy coated, roughened or otherwise constructed to enhance its frictional engagement with the bore wall; and, as illustrated, the body 12 of the stabilizer 10 is of a length to extend substantially the entire length of the bore 20. The pull-out force of the installed stabilizer 10 is somewhat greater than the installation or push-in force applied to the stabilizer, thereby enabling such pull-out force to be predetermined by knowledge of the applied push-in force.

Figure 5:
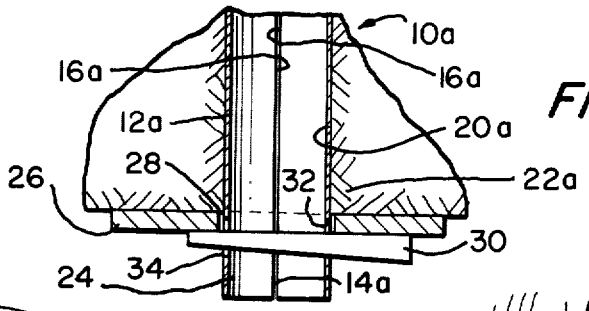
FIG. 5 is a fragmentary, elevational sectional view of a second stabilizer constructed in accordance with the invention showing such in a bore in the roof of a mine shaft or other undergound opening.

FIG. 5, wherein parts similar to those shown in FIGS. 1 through 4 are designated by the corresponding reference numerals followed by the suffix "a", fragmentarially illustrates a friction rock stabilizer 10a which is different from the stabilizer 10 only in that it further includes means for tensioning the body 12a after its insertion into the bore 20a. More particularly, as shown in FIG. 5, the body 12a of the stabilizer 10a is inserted into the bore 20a such that a minor portion 24 (for example, a few inches) of the length of the body 12a is external to the bore 20a. The stabilizer 10a includes a plate 26 having a central opening 28 receiving the body 12a, the plate 26 being mounted along the lower surface of the roof 22a; and the stabilizer 10 further includes a wedge pin 30 inserted through aligned openings 32, 34 in the body 12a immediately beneath the plate 26 to tension the body 12a after its insertion into the bore 20a.

If desired, either of the stabilizers 10, 10a could be provided with a wedge, per se of any suitable configuration, which is inserted into the innermost or leading end of its body 12, 12a after the body 12, 12a has been installed in its bore 20, 20a in the beforedescribed manner. Neither of the stabilizers 10, 10a, however, requires such a wedge; and both of the stabilizers 10, 10a will provide highly efficient and safe anchoring without a wedge. Moreover, in the event that a wedge is employed with either of the stabilizers 10 or 10a, it must be disposed during the insertion of the stabilizer body 12 or 12a into its bore 20 or 20a to preclude it from interference with the beforedescribed substantial circumferential compression of the body 12 or 12a occurring during such insertion.

The methods of the invention may, generally considered, comprise the steps of forming a bore 20 in the structure to be anchored, providing a circumferentially compressible stabilizer 10 having an outer circumference of a diameter larger than that of the formed bore 20, and inserting the stabilizer 10 into the bore 20 whereby the body of the stabilizer 10 is circumferentially compressed during such insertion, thereby at least substantially closing the slot 14, and the outer circumference of the circumferentially compressed body 12 frictionally engages the wall of the bore 20 for anchoring the structure.

From the preceding description, it will be seen that the invention provides new and improved stabilizers and methods, for attaining all of the aforestated objects and advantages. It will be understood, however, that although only two embodiments of the invention have been illustrated and hereinbefore described, the invention is not limited merely to these two embodiments, but rather contemplates other embodiments and variations within the scope of the following claims.

I claim:

1. A friction stabilizer for insertion in a bore in a structure such as a roof or side wall of a mine shaft or other underground opening for anchoring the structure, said stabilizer comprising a generally annular body from end-to-end having a slot through its thickness, said body including edge portions extending along opposite sides of said slot and relatively arranged to permit substantial circumferential compression of said body, said body being of outer diameter predetermined to be substantially larger than the diameter of the bore in which it is to be inserted such that insertion of said body in such bore causes substantial circumferential compression of said body, said body being dimensioned to be plastically deformed during its insertion in such bore, the stabilizer being free of structure precluding said substantial compression and plastic deformation of said body during its said insertion, said body being of material permitting its said substantial compression and plastic deformation during its said insertion and, after such insertion, causing the body outer periphery to frictionally engage the surrounding wall of the bore for frictionally anchoring the structure, the ratio of the length of said body to the outer diameter thereof being at least about 16 to 1, the ratio of the radial thickness of said body to the outer diameter thereof being at a maximum about 1 to 5 and at a minimum about 1 to 50, and the outer circumferential dimension of said body being at least two inches.

2. A friction stabilizer according to claim 1, wherein the circumferential width of said slot is at a maximum about 25 percent of the outer circumferential dimension of said body.

3. A friction stabilizer according to claim 1, wherein the outer periphery of said body is at least substantially imperforate.

4. A friction stabilizer according to claim 1, wherein said slot is straight from end-to-end of said body.

5. A friction stabilizer according to claim 1, wherein the interior of said body is open.

6. A friction stabilizer according to claim 1, further comprising means for tensioning said body after its insertion in a bore.

7. A friction stabilizer according to claim 1, further comprising wedge means movable internally of an end of said body.

*8. A friction stabilizer for insertion in a bore in a structure such as a roof or side wall of a mine shaft or other underground opening for anchoring the structure, said stabilizer comprising when inserted a generally annular body arranged to permit when inserted substantial circumferential compression of said body against the surrounding wall of the bore, said body being of substantially the same transverse dimension along substantially its full length, said body being of outer diameter predetermined to be substantially larger than the diameter of the bore in which it is to be inserted such that insertion of said body in such bore causes substantial circumferential compression of said body, said body being dimensioned to be plastically deformed during its insertion in such bore, the stabilizer being free of structure precluding such substantial compression and plastic deformation of said body during its said insertion, said body being of material permitting its said substantial circumferential compression and transverse plastic deformation after said insertion in the event of a shift of said structure in a plane transverse to the length of said stabilizer, and, after such insertion, causing the body outer periphery to frictionally engage the surrounding wall of the bore for frictionally anchoring the structure, the ratio of the length of said body to the outer diameter thereof being at least about* 16 to 1, the ratio of the radial thickness of said body to the outer diameter thereof being at a maximum about 1 to 5 and at a minimum about 1 to 50, and the outer circumferential dimension of said body being at least two inches.

*9. A friction stabilizer, according to claim 8, wherein: said material comprises means plastically responsive to diverse, radial-component forces applied to said body, as by a surface of said surrounding wall of the bore, substantially fully along a continuous and substantially full length of said body to effect an engagement of said body with said surrounding wall of the bore with a given, substantially uniformly distributed, anchoring force.*

*10. A friction stabilizer, according to claim 9, wherein: said material further comprises means which, responsive to an axial translation of said stabilizer due to strata separation of said structure or the like, causes said body to retain such engagement with substantially all said given anchoring force.*

*11. A friction stabilizer for insertion in a bore in a structure such as a roof or side wall of a mine shaft or other underground opening for anchoring the structure, said stabilizer comprising when inserted a generally annular body arranged to permit when inserted substantial circumferential compression of said body against the surrounding wall of the bore, said body being of substantially the same transverse dimension along substantially its full length, said body being of outer diameter predetermined to be substantially larger than the diameter of the bore in which it is to be inserted such that insertion of said body in such bore causes substantial circumferential compression of said body, said body being dimensioned to be plastically deformed during its insertion in such bore, the stabilizer being free of structure precluding such substantial compression and plastic deformation of said body during its said insertion, said body being of material permitting its said substantial circumferential compression and transverse plastic deformation after said insertion in the event of a shift of said structure in a plane transverse to the length of said stabilizer, and, after such insertion, causing the body outer periphery to frictionally engage the surrounding wall of the bore for frictionally anchoring the structure, and wherein said material comprises means plastically responsive to diverse, radial-component forces applied to said body, as by a surface of said surrounding wall of the bore, substantially fully along a continuous and substantially full length of said body to effect an engagement of said body with said surrounding wall of the bore with a given, substantially uniformly distributed, anchoring force.*

*12. A friction stabilizer for insertion in a bore in a structure such as a roof or side wall of a mine shaft or other underground opening for anchoring the structure, said stabilizer comprising when inserted a generally annular body arranged to permit when inserted substantial circumferential compression of said body against the surrounding wall of the bore, said body being of substantially the same transverse dimension along substantially its full length, said body being of outer diameter predetermined to be substantially larger than the diameter of the bore in which it is to be inserted such that insertion of said body in such bore causes substantial circumferential compression of said body, said body being dimensioned to be plastically deformed during its insertion in such bore, the stabilizer being free of structure precluding such substantial compression and plastic deformation of said body during its said insertion, said body being of material permitting its said substantial circumferential compression and transverse plastic deformation after said insertion in the event of a shift of said structure in a plane transverse to the length of said stabilizer, and, after such insertion, causing the body outer periphery to frictionally engage the surrounding wall of the bore for frictionally anchoring the structure, and wherein the material comprises means which, responsive to an axial translation of said stabilizer due to strata separation of said structure or the like, causes said body to retain such engagement with substantially all said given anchoring force.*

*13. A friction stabilizer for insertion in a bore in a structure such as a roof or side wall of a mine shaft or other underground opening for anchoring the structure, said stabilizer comprising a generally tubular body of substantially one cross-sectional configuration along substantially its full length, said body having a maximum transverse dimension predetermined to be larger than the maximum transverse dimension of the bore in which it is to be in-*

*serted, whereby insertion of said body in such bore causes circumferential compression and deformation of said body, the stabilizer being free of structure precluding such circumferential compression and deformation of said body, and said body being of material which, in response to a bore insertion of said stabilizer (a) permits both said circumferential compression of said body, and a transverse deformation thereof as well, in the event of a shift in a plane transverse to the length of said stabilizer, of a section or sections of any such bored structure in which said stabilizer shall have been inserted; (b) causes said body, to frictionally engage the wall of any such bore, thereby to anchor the bored structure, substantially fully along a continuous and substantially full length of said body, with a given, substantially uniformly distributed, anchoring force; and which also (c) maintains not less than substantially all said given anchoring force, even in the event of partial or full collapse of said body at some location therealong, in that portions of said body, defined by or subsisting opposite any such collapse, apply some proportionate anchoring forces to corresponding portions of such bore wall thereabout, whether such portions of said body are coaxially or linearly aligned with each other, or displaced or shifted therebetween by any such collapse.*

*14. A friction stabilizer, according to claim 13, wherein said material comprises means plastically responsive to diverse, radial-component forces applied to said body, by a surface of the wall of a structure bore, upon said stabilizer being inserted into such bore.*

*15. A friction stabilizer, according to claim 13, wherein said material comprises means which, responsive to an axial translation of said stabilizer, due to strata separation, or the like, of a bored structure in which said stabilizer shall have been inserted, causes said body to retain such frictional engagement thereof with the wall of a bore in such structure as to maintain substantially all said given anchoring force.*

* * * * *

UNITED STATES PATENT AND TRADEMARK OFFICE

CERTIFICATE OF CORRECTION

PATENT NO. : Re. 30,256

DATED : April 8, 1980

INVENTOR(S) : James J. Scott

It is certified that error appears in the above-identified patent and that said Letters Patent are hereby corrected as shown below:

Column 8, line 1 change "some" to -- same --.

Signed and Sealed this

*Twenty-second* Day of *July 1980*

[SEAL]

*Attest:*

SIDNEY A. DIAMOND

*Attesting Officer*

*Commissioner of Patents and Trademarks*